US012451830B2

(12) United States Patent
Valente et al.

(10) Patent No.: US 12,451,830 B2
(45) Date of Patent: Oct. 21, 2025

(54) ARRANGEMENT FOR ELECTRIC POWER CONVERSION AND DUAL ELECTRIC DRIVE

(71) Applicant: HUAWEI TECHNOLOGIES CO., LTD., Guangdong (CN)

(72) Inventors: Mauro Valente, Nuremberg (DE); Piniwan Thiwanka Bandara Wijekoon, Nuremberg (DE); Francisco Daniel Freijedo Fernández, Nuremberg (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 104 days.

(21) Appl. No.: 18/335,196

(22) Filed: Jun. 15, 2023

(65) Prior Publication Data
US 2023/0336102 A1    Oct. 19, 2023

Related U.S. Application Data

(63) Continuation of application No. PCT/EP2020/086348, filed on Dec. 16, 2020.

(51) Int. Cl.
*H02P 25/18* (2006.01)
*B60L 50/60* (2019.01)
(Continued)

(52) U.S. Cl.
CPC .............. *H02P 25/18* (2013.01); *B60L 50/60* (2019.02); *B60L 53/24* (2019.02); *H02J 7/02* (2013.01);
(Continued)

(58) Field of Classification Search
CPC .......... H02P 25/18; H02P 25/74; B60L 50/60; B60L 53/24; B60L 2220/12; B60L 2220/56; H02J 7/02; Y02T 10/7072; Y02T 90/14
See application file for complete search history.

(56) References Cited

U.S. PATENT DOCUMENTS

| 5,099,186 A | 3/1992 | Rippel et al. |
| 8,183,820 B2 | 5/2012 | Anwar et al. |
(Continued)

FOREIGN PATENT DOCUMENTS

CN    111200308 A    5/2020

OTHER PUBLICATIONS

Zheng Wang et al: A Dual-Channel Magnetically Integrated EV Chargers Based on Double-Stator-Winding Permanent-Magnet Synchronous Machines, A Dual-Channel Magnetically Integrated EV Chargers Based on Double-Stator-Winding Permanent-Magnet Synchronous Machines, IEEE Transactions on Industry Applications, vol. 55, No. 2, Mar./Apr. 2019, total 13 pages.
(Continued)

*Primary Examiner* — Jeffrey M Shin

(57) ABSTRACT

The technology of this application relates to an arrangement for electric power conversion and dual electric drive, a system comprising the arrangement, a method of operating the arrangement, and a computer program for carrying out the method, which enable charging of dual-drive electric vehicles (EV) from a three-phase power grid without producing any torque, while making use of all the power electronics already existing for the traction system and the motor inductances. As such, space is saved and power density, efficiency and reliability are increased.

20 Claims, 12 Drawing Sheets

(51) Int. Cl.
  *B60L 53/24* (2019.01)
  *H02J 7/02* (2016.01)
  *H02P 5/74* (2006.01)

(52) U.S. Cl.
  CPC ............ *H02P 5/74* (2013.01); *B60L 2210/22* (2013.01); *B60L 2210/30* (2013.01); *B60L 2220/12* (2013.01); *B60L 2220/14* (2013.01); *B60L 2220/42* (2013.01); *B60L 2220/56* (2013.01); *B60L 2240/423* (2013.01); *H02J 2207/20* (2020.01)

(56) References Cited

U.S. PATENT DOCUMENTS

| | | | | |
|---|---|---|---|---|
| 9,780,702 | B2* | 10/2017 | Li | ........................ B60L 3/0092 |
| 2012/0206076 | A1* | 8/2012 | Tanaka | .............. H02M 7/53873 |
| | | | | 318/400.28 |

OTHER PUBLICATIONS

International Search Report for PCT Application No. PCT/EP2020/086348 dated Aug. 30, 2021, 14 pages.
Ali Syed Qaseem et al: "Torque Cancelation of Integrated Battery Charger Based on Six-Phase Permanent Magnet Synchronous Motor Drives for Electric Vehicles", IEEE Transactions on Transportation Electrification, IEEE, vol. 4, No. 2, Jun. 1, 2018, XP011684924A, total 11 pages.

* cited by examiner

ARRANGEMENT FOR ELECTRIC POWER CONVERSION AND DUAL ELECTRIC DRIVE

CROSS-REFERENCE TO RELATED APPLICATIONS

This application is a continuation of International Application No. PCT/EP2020/086348, filed on Dec. 16, 2020, the disclosure of which is hereby incorporated by reference in its entirety.

TECHNICAL FIELD

The present disclosure relates to electric charging in electric vehicle (EV) applications. The disclosure provides an arrangement for electric power conversion and a dual electric drive, a system comprising the arrangement, a method of operating the arrangement, and a computer program for carrying out the method.

BACKGROUND

Most EV architectures rely on physically separate charging and traction functions realized by an on-board charger (OBC) and a traction converter/inverter, respectively. As the name suggests, the OBC is on-board all the time, requires dedicated space, needs to be carried within the vehicle, and fails to provide any added functionality while the vehicle is moving. This implies high capital expenditure (CAPEX) and operational expenditure (OPEX).

However, charging and drive functions of EVs are usually not in use simultaneously. Exemplary attempts of combining the charging and drive functions together in the same hardware imply a number of major limitations.

For example, fully integrated solutions are limited in functionality and operation. This makes an EV system inflexible, and does not address the anxiety of a majority of EV users.

Charging from a three-phase grid is achieved by means of additional non-shared converters, or by employing more than one electric motor, or with the use of multi-phase machines. In some other cases, charging from a three-phase grid generates torque. Evidently, this is detrimental for efficiency, lifetime of the mechanical parts, and produces noise and vibration.

SUMMARY

In view of the above-mentioned adverse issues, it is an objective to reduce an overall size and cost of a system for electric charging and traction drive in an EV application, regardless of whether a single-phase or three-phase charging operation is employed.

This and other objectives are achieved by the embodiments as defined by the independent claims. Further embodiments are set forth in the dependent claims and in the following description and drawings.

A first aspect of the present disclosure provides an arrangement for electric power conversion and dual electric drive. The arrangement comprises first and second power converters respectively comprising three legs; first and second electric motors respectively including three open-end stator windings respectively having first and second ends; and first and second power switches. The first ends of the stator windings of the first electric motor are connected to respective legs of the three legs of the first power converter. The first ends of the stator windings of the second electric motor are connected to respective legs of the three legs of the second power converter. The second ends of the stator windings of the first electric motor are connected together and have a same electric potential. The second ends of the stator windings of the second electric motor are connected together and have a same electric potential. The first power switch is configured to selectively disconnect one of the second ends of the stator windings of the first electric motor from all other of its second ends to establish at most two distinct electric potentials; The second power switch is configured to selectively disconnect one of the second ends of the stator windings of the second electric motor from all other of its second ends to establish at most two further distinct electric potentials.

A dual electric drive as used herein may refer to an electric drive using two independently controllable electric motors.

A power converter as used herein may refer to a device that is capable of converting electric energy from one form to another, such as converting between alternating current (AC) and direct current (DC) and/or vice versa, changing a voltage or frequency, or some combination of these. In particular, power converters may comprise switched-mode power converters.

A stator as used herein may refer to a stationary part of a rotary system, such as an electric motor. In an electric motor, the stator may comprise a number of windings to provide a rotating magnetic field that drives a rotor.

Open-end as used herein may refer to inner terminals of a stator winding of an electric motor being accessible and reconfigurable.

A power switch as used herein may refer to a switch that is designed for high-voltage and/or high-current applications. In particular, power switches may comprise power semiconductor devices, such as insulated gate bipolar transistors (IGBTs).

The arrangement of the first aspect enables a charging mode of the EV in connection with a three-phase power grid without producing any torque, and may make use of all the power electronics already existing for the traction system and the motor inductances. As such, space can be saved and power density, efficiency, and reliability are increased.

According to an implementation of the first aspect, the arrangement further comprises a third power switch configured to selectively combine those two of the established distinct electric potentials involving most of the stator windings of the first electric motor and least of the stator windings of the second electric motor.

This extends the possibilities of connectivity that enable single-phase charging in connection with the arrangement, and provides a capability of coupling the electric motors.

According to an implementation of the first aspect, the first power switch is configured to disconnect none of the second ends of the stator windings of the first electric motor from each other to establish a single distinct electric potential; and the second power switch is configured to disconnect none of the second ends of the stator windings of the second electric motor from each other to establish a single further distinct electric potential.

This configuration enables a traction mode of the EV in a configuration comprising two power switches.

According to an implementation of the first aspect, the first power switch is configured to disconnect none of the second ends of the stator windings of the first electric motor from each other to establish a single distinct electric potential; the second power switch is configured to disconnect none of the second ends of the stator windings of the second electric motor from each other to establish a single further distinct electric potential; and the third power switch is configured to combine none of the established distinct electric potentials.

This configuration enables a traction mode of the EV in a configuration comprising three power switches.

According to an implementation of the first aspect, the established distinct electric potentials is connectable to two respective legs of a single-phase power grid interface connectable to the arrangement.

According to an implementation of the first aspect, the first power switch is configured to disconnect one of the second ends of the stator windings of the first electric motor from all other of its second ends to establish at most two distinct electric potentials; the second power switch is configured to disconnect one of the second ends of the stator windings of the second electric motor from all other of its second ends to establish at most two further distinct electric potentials; the third power switch is configured to combine those two of the established distinct electric potentials involving most of the stator windings of the first electric motor and least of the stator windings of the second electric motor; and the established distinct electric potentials is connectable to three respective legs of a three-phase power grid interface connectable to the arrangement.

According to an implementation of the first aspect, at least one of the first and second power converters is configured to operate according to a direct torque control, field oriented control, model predictive control, or open-loop control strategy, and configured to regulate a torque of the respective electric motor according to a respective torque reference.

A torque as used herein may refer to a rotational equivalent of a linear force, produced by an electric motor to effect a propulsion of an EV.

This improves a customizability to various EV requirements.

According to an implementation of the first aspect, at least one of the first and second power converters is configured to regulate an electric parameter on a demand side of the at least one of the first and second power converters.

This enables a bidirectional operation of the at least one power converter and the arrangement. As such, the arrangement may be able to charge an energy storage, such as a battery, from the power grid, and to use the stored electric power to produce torque. Moreover, the arrangement may be able to return the stored electric power to the power grid, if needed.

According to an implementation of the first aspect, at least one of the first and second power converters is configured to perform AC/AC power conversion; and the first ends of the stator windings of the respective motor are connected to the respective legs of an AC side of the at least one of the first and second power converters.

According to an implementation of the first aspect, at least one of the first and second power converters is configured to perform AC/DC power conversion; and the first ends of the stator windings of the respective motor are connected to the respective legs of the AC side of the at least one of the first and second power converters.

These alternative configurations improve a customizability to various EV requirements.

According to an implementation of the first aspect, at least one of the first and second power converters comprise a parallel connection of three independently controlled half-bridges providing the respective legs of the at least one of the first and second power converters.

This configuration enables a modular multi-cell architecture of the power converter.

According to an implementation of the first aspect, at least one of the first and second power converters comprise a parallel connection of three independently controlled two-level (2L) half-bridges.

This configuration based on 2L half-bridges providing two DC voltage levels implies low complexity.

According to an implementation of the first aspect, at least one of the first and second power converters comprises a parallel connection of three independently controlled n-level (nL) half-bridges, wherein a number n of levels exceeds two.

This configuration based on nL half-bridges providing additional DC voltage levels reduces a loss and stress of switching components, and is particularly suitable for high-voltage applications.

According to an implementation of the first aspect, the arrangement is connectable to the power grid interface comprising an electromagnetic interference (EMI) filter and an all-pole grid cutoff switch providing the legs of the power grid interface.

This configuration improves EMI suppression and a safety of operation in charging modes of the EV.

According to an implementation of the first aspect, at least one of the first and second electric motors comprises an induction motor or a permanent magnet synchronous machine.

An asynchronous (or induction) motor as used herein may refer to an AC-driven electric motor in which an electric current in the rotor needed to produce torque is obtained by electromagnetic induction from a magnetic field of the stator winding(s). In other words, the induction motor must rotate slightly slower than the AC cycles in order to induce the electric current in the rotor winding.

A synchronous motor as used herein may refer to an AC-driven electric motor in which, at steady state, a rotation of the rotor is synchronized with a frequency of the supply current, and a rotation period is exactly equal to an integral number of AC cycles. In other words, the synchronous motor rotates at a rate locked to the line frequency. A permanent-magnet synchronous motor uses permanent magnets embedded in the rotor to create a constant magnetic field.

These configurations improve a customizability to various EV requirements.

A second aspect of the present disclosure provides a system, comprising an arrangement according to the first aspect or any of its embodiments, a power grid interface connected to the first and second electric motors of the arrangement, an energy storage interface connected to the first and second power converters of the arrangement, and an energy storage connected to the energy storage interface.

The system enables charging the energy storage of an EV, such as a battery, from the power grid, using the stored electric power to produce torque, and even returning the stored electric power to the power grid, if needed.

A third aspect of the present disclosure provides a method of operating an arrangement for electric power conversion and dual electric drive. The arrangement comprises: first and second power converters respectively comprising three output legs; first and second electric motors respectively including three open-end stator windings respectively having first and second ends; first and second power switches; the second ends of the stator windings of the first electric motor connected together and having a same electric potential; and the second ends of the stator windings of the second electric motor connected together and having a same electric potential. The method comprises: connecting the first ends of the stator windings of the first electric motor to respective legs of the three legs of the first power converter; connecting the first ends of the stator windings of the second electric motor to respective legs of the three legs of the second power converter; selectively disconnecting, using the first power switch, at most one of the second ends of the stator windings of the first electric motor from all other of the second ends to establish at most two distinct electric potentials; and selectively disconnecting, using the second power switch, at most one of the second ends of the stator windings of the second electric motor from all other of the second ends to establish at most two further distinct electric potentials.

This enables a charging mode of the EV in connection with a three-phase power grid without producing any torque, making use of all the power electronics already existing for the traction system and the motor inductances. As such, space is saved and power density, efficiency and reliability are increased.

According to an implementation of the third aspect, the method comprises utilizing the arrangement according to the first aspect or any of its embodiments.

The above-mentioned device features and the associated advantages also apply in connection with the method according to the third aspect by analogy.

A fourth aspect of the present disclosure provides a computer program comprising a program code for carrying out the method according to the third aspect or any of its embodiments when implemented on a processor of the arrangement according to the first aspect or any of its embodiments.

It is noted that all devices, elements, units and means described in the disclosure could be implemented in the software or hardware elements or any kind of combination thereof. All steps which are performed by the various entities described in the disclosure as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects will be explained in the following description of various embodiments in relation to the enclosed drawings, in which.

DETAILED DESCRIPTION OF EMBODIMENTS

Figure 1:
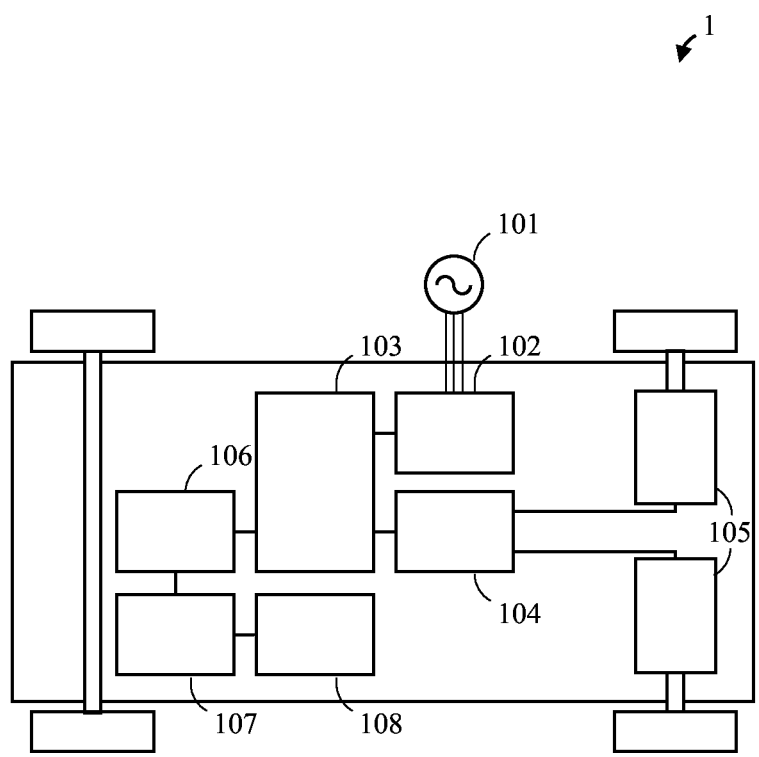
FIG. 1 illustrates an exemplary EV architecture having a dual motor drive.

The above described aspects will now be described with respect to various embodiments illustrated in the enclosed drawings.

The features of these embodiments may be combined with each other unless specified otherwise.

The drawings are to be regarded as being schematic representations and elements illustrated in the drawings are not necessarily shown to scale. Rather, the various elements are represented such that their function and general purpose become apparent to a person skilled in the art.

FIG. 1 illustrates an exemplary EV architecture having a dual motor drive.

In a charging mode of the EV architecture 1, a three-phase AC input 101 feeds electric power to an on-board charger 102, which in turn supplies the electric power to a high-voltage powertrain battery 103, where the electric power is stored temporarily.

In a traction mode of the EV architecture 1, three-phase inverters 104 tap the energy stored in the powertrain battery 103 to supply respective electric motors 105 which convert the electric power to torque applied to drive axles of the EV.

In both charging and traction modes, an auxiliary power module (APM) 106 taps the energy stored in the powertrain battery 103, converts the high voltage down to a low voltage, such as 12V, and supplies the electric power to a low-voltage auxiliary battery 107, where the electric power is stored temporarily. A control unit 108 of the powertrain of the EV taps the energy stored in the auxiliary battery 107 to ensure its own operation.

EV architectures such as the one shown in FIG. 1 rely on physically separated charging 102 and traction 104, 105 functions. The charging 102 function is on-board all the time, requires dedicated space, needs to be carried within the car while the car is moving, and fails to provide any added functionality.

As will be explained in the following, the disclosure aims to combine the charging and traction functions, regardless of single-phase or three-phase charging operation.

Figure 2:
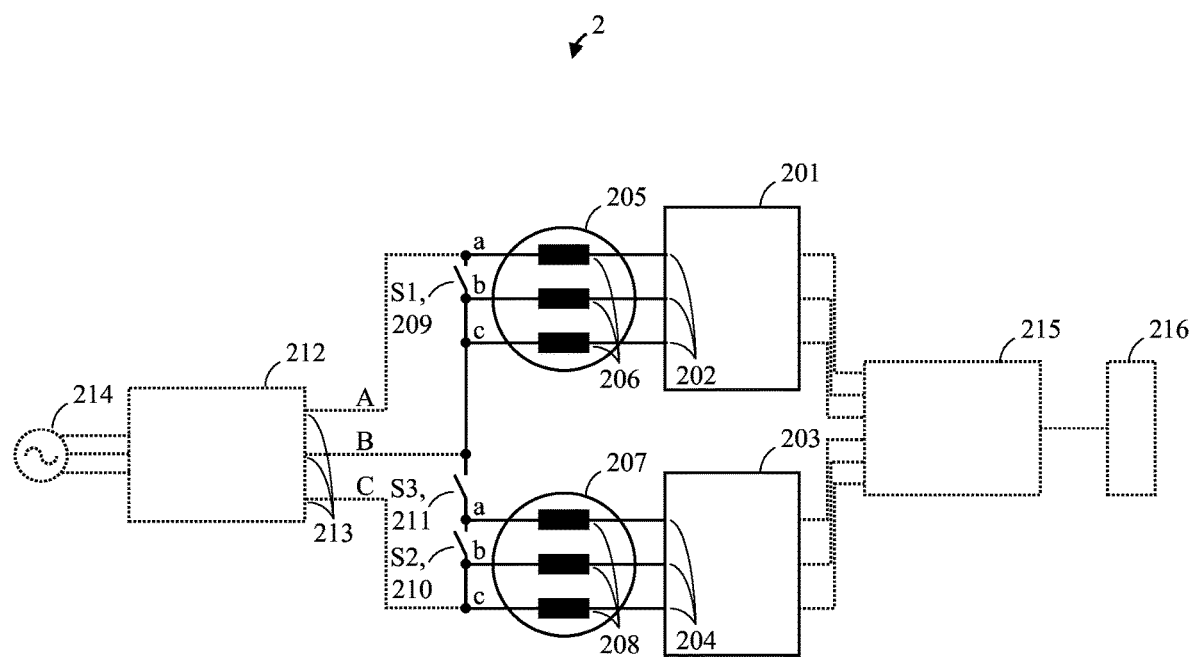
FIG. 2 illustrates an arrangement according to an example of the disclosure.

FIG. 2 illustrates an arrangement 2 according to an example of the disclosure;

The arrangement 2 is suitable for electric power conversion and a dual electric drive, and comprises a first power converter 201 comprising three legs 202; and a second power converter 203 comprising three legs 204.

At least one of the first and second power converters 201, 203 may be configured to regulate an electric parameter on a demand side of the at least one of the first and second power converters 201, 203.

The arrangement 2 further comprises a first electric motor 205 including three open-end stator windings 206 respectively having a first end as well as a second end (identified as 'a', 'b', 'c'); and a second electric motor 207 including three open-end stator windings 208 respectively having a first end and a second end (identified as 'a', 'b', 'c' as well).

At least one of the first and second electric motors 205, 207 may comprise an induction motor or a permanent magnet synchronous machine.

The first ends of the stator windings 206 of the first electric motor 205 are connected to respective legs of the three legs 202 of the first power converter 201. Similarly, the first ends of the stator windings 208 of the second electric motor 207 are connected to respective legs of the three legs 204 of the second power converter 203. The second ends 'a', 'b', 'c' of the stator windings 206 of the first electric motor 205 are connected together and have a same electric potential. Likewise, the second ends 'a', 'b', 'c' of the stator windings 208 of the second electric motor 207 are connected together and have a same electric potential.

The arrangement 2 further comprises a first power switch 209, 'S'; and a second power switch 210, 'S2'. The first power switch 209, 'S1' is configured to selectively disconnect one (i.e., 'a') of the second ends 'a', 'b', 'c' of the stator windings 206 of the first electric motor 205 from all other (i.e., 'b', 'c') of its second ends 'a', 'b', 'c' to establish at most two distinct electric potentials. Analogously, the second power switch 210, 'S2' is configured to selectively disconnect one (i.e., 'a') of the second ends 'a', 'b', 'c' of the stator windings 208 of the second electric motor 207 from all other (i.e., 'b', 'c') of its second ends 'a', 'b', 'c' to establish at most two further distinct electric potentials.

The arrangement 2 may further comprise a third power switch 211, 'S3' configured to selectively combine those two of the established distinct electric potentials involving most of the stator windings 206 of the first electric motor 205 and least of the stator windings 208 of the second electric motor 207.

Generally, a connectivity between the legs 213, 'A', 'B', 'C' of the power grid interface 212 and the second ends 'a', 'b', 'c' of the stator windings 206, 208 of the first and second electric motors 205, 207 may be expressed in dependence of the switching states of the first power switch 209, 'S1', of the second power switch 210, 'S2', and—when applicable—of the third power switch 211, 'S3' as follows:

A comparison of FIGS. 1 and 2 reveals that the on-board charger 102 of FIG. 1 is merged into the electric motors 205, 207.

The arrangement 2 enables: charging the energy storage 216 of an EV, such as a battery, from the power grid 214; using the stored electric power to produce torque; and even returning the stored electric power to the power grid, if needed.

Figure 3:
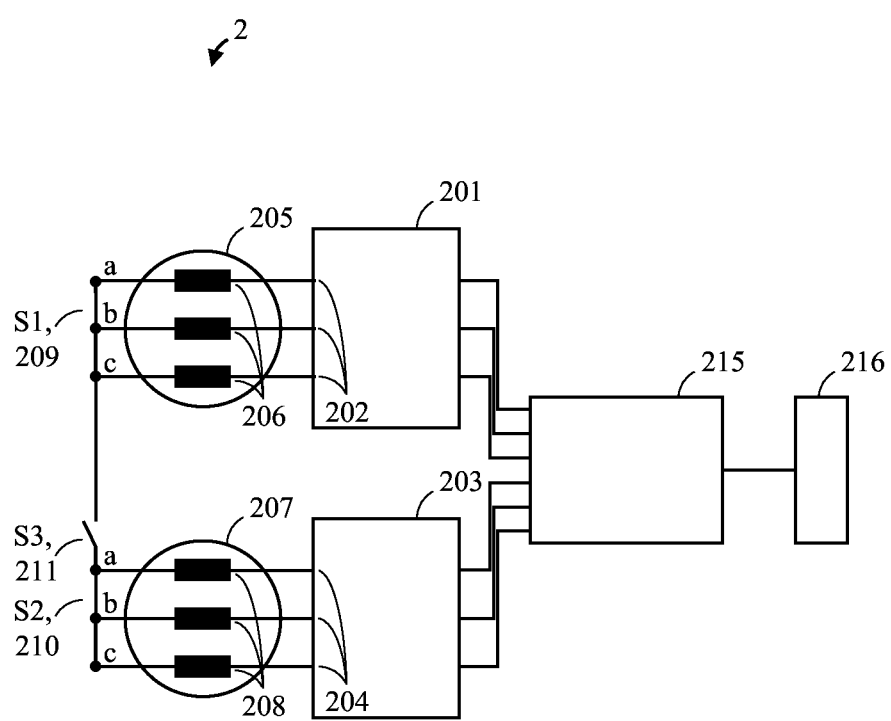
FIG. 3 illustrates an arrangement according to an example of the disclosure for torque (i.e., drive) production.

FIG. 3 illustrates an arrangement 2 according to an example of the disclosure for torque (i.e., drive) production.

Torque/drive production requires the second ends 'a', 'b', 'c' of the stator windings 206 of the first electric motor 205 to be connected to one another so as to form a star configuration, the second ends 'a', 'b', 'c' of the stator windings 208 of the second electric motor 207 to be connected to one another so as to form a star configuration as well, and these two star configurations to be isolated from each other, as follows:

The first power switch 209, 'S1' may be configured to disconnect none of the second ends 'a', 'b', 'c' of the stator windings 206 of the first electric motor 205 from each other to establish a single distinct electric potential.

The second power switch 210, 'S2' may be configured to disconnect none of the second ends 'a', 'b', 'c' of the stator windings 208 of the second electric motor 207 from each other to establish a single further distinct electric potential.

The third power switch 211, 'S3' may be configured to combine none of the established distinct electric potentials.

In other words, the first power switch 209, 'S1' may be closed/conductive/on (i.e., S1=1), the second power switch 210, 'S2' may be closed/conductive/on (i.e., S2=1) as well, and the third power switch 211, 'S3' may be open/non-conductive/off (i.e., S3=0), as is indicated in FIG. 3.

With reference to Table I established above, it turns out that no connectivity between the legs 213, 'A', 'B', 'C' of the power grid interface 212 and the second ends 'a', 'b', 'c' of the stator windings 206, 208 of the respective electric motor 205, 207 may be expressed in dependence of the above-identified combination of the switching states of the first power switch 209, 'S1', the second power switch 210, 'S2', and the third power switch 211, 'S3':

TABLE I

Connectivity of grid interface 212 (legs A, B, C) and electric motors 205, 207 (stator winding ends a, b, c)

| Leg of power grid interface | first electric motor 205 | | | second electric motor 207 | | |
|---|---|---|---|---|---|---|
| | a | b | c | a | b | c |
| A | 1 | S1 | S1 | S1 · S3 | S1 · S2 · S3 | S1 · S2 · S3 |
| B | S1 | 1 | 1 | S3 | S2 · S3 | S2 · S3 |
| C | S1 · S2 · S3 | S2 · S3 | S2 · S3 | S2 | 1 | 1 |

For example, leg 'A' of the power grid interface 212 and second end 'b' of the second electric motor 207 are connected if all the power switches are in a closed/conductive/on state (i.e., S1=S2=S3=1).

Charging the energy storage 216 from the power grid 214 requires forming a system comprising an arrangement 2 for electric power conversion and dual electric drive as indicated previously; a power grid interface 212 connected to the first and second electric motors 205, 207 of the arrangement 2; an energy storage interface 215 connected to the first and second power converters 201, 203 of the arrangement 2; and an energy storage 216 connected to the energy storage interface 215.

The arrangement 2 of FIG. 2 enables replacing the corresponding arrangement of FIG. 1 consisting of the on-board charger 102, the powertrain battery 103, the three-phase inverters 104 and the electric motors 105.

TABLE II

Possible combinations of switching states $S_1$, $S_2$, $S_3$ enabling production of torque/drive

| Switching states | | | first electric motor 205 | | | second electric motor 207 | | |
|---|---|---|---|---|---|---|---|---|
| S1 | S2 | S3 | a | b | c | a | b | c |
| 1 | 1 | 0 | — | — | — | — | — | — |

Having no connectivity between the power grid interface 212 and the electric motors 205, 207 evidently disables charging and enables producing torque/drive using electrical energy from the energy storage 216.

In connection with torque/drive production, at least one of the first and second power converters 201, 203 may be configured to operate according to a direct torque control (DTC), field oriented control (FOC), model predictive control (MPC), or open-loop control strategy, and may be configured to regulate a torque of the respective electric motor according to a respective torque reference.

Figure 4:
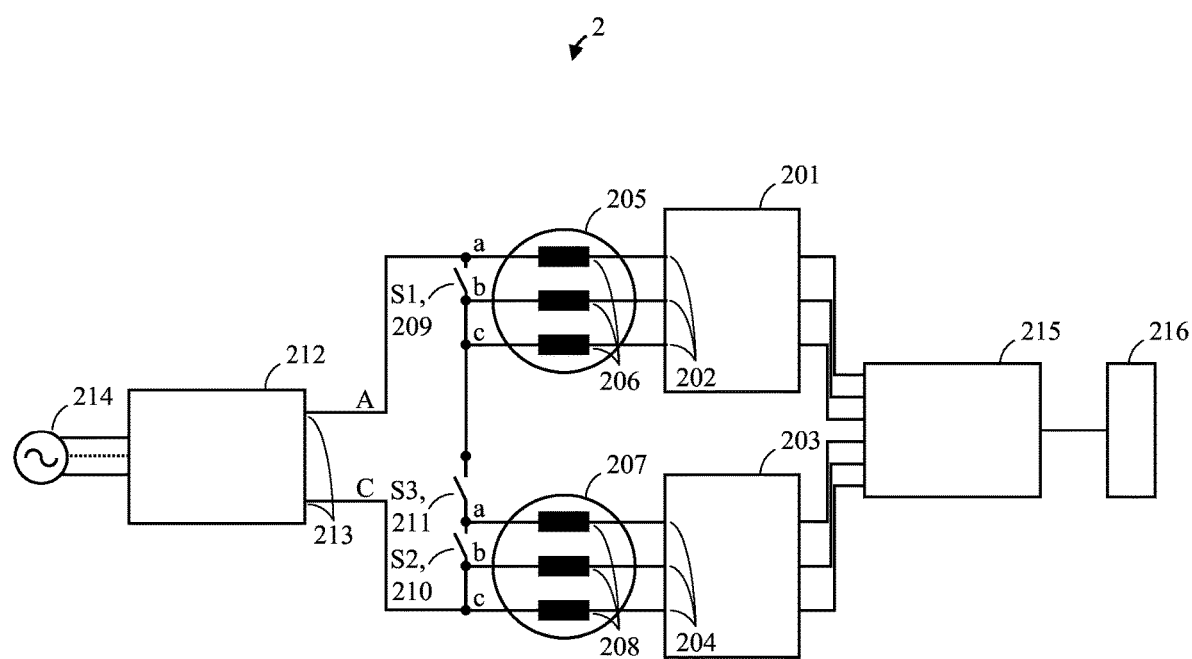
FIGS. 4-6 illustrate arrangements according to various examples of the disclosure for single-phase charging.
Figure 5:
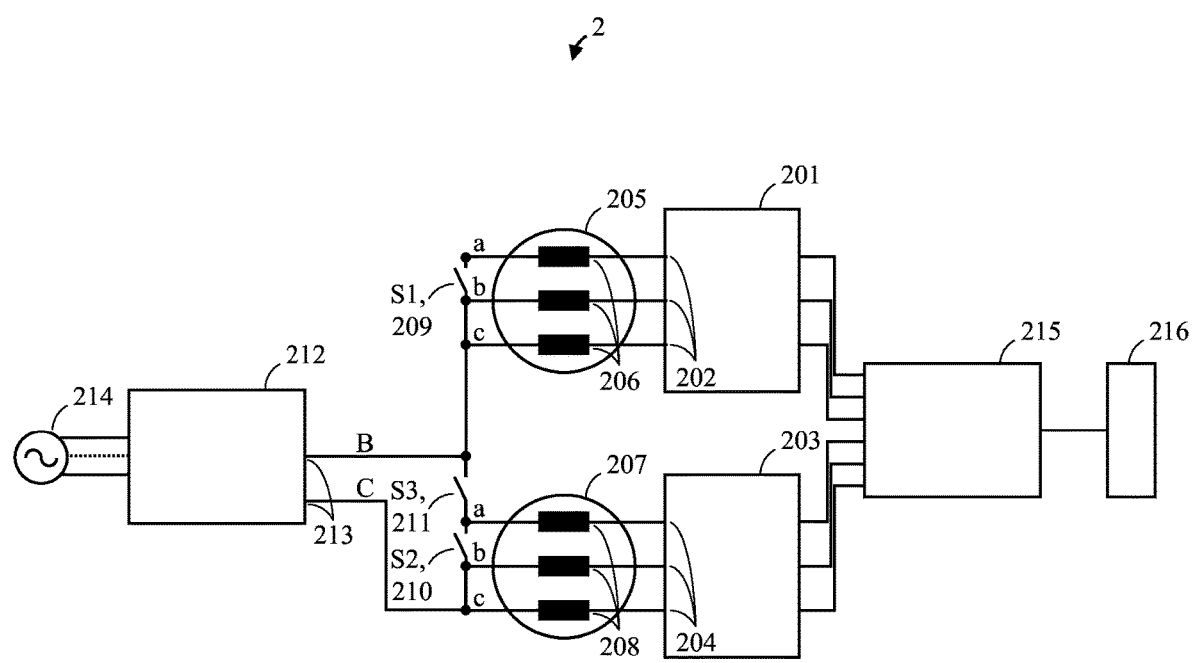
Figure 6:
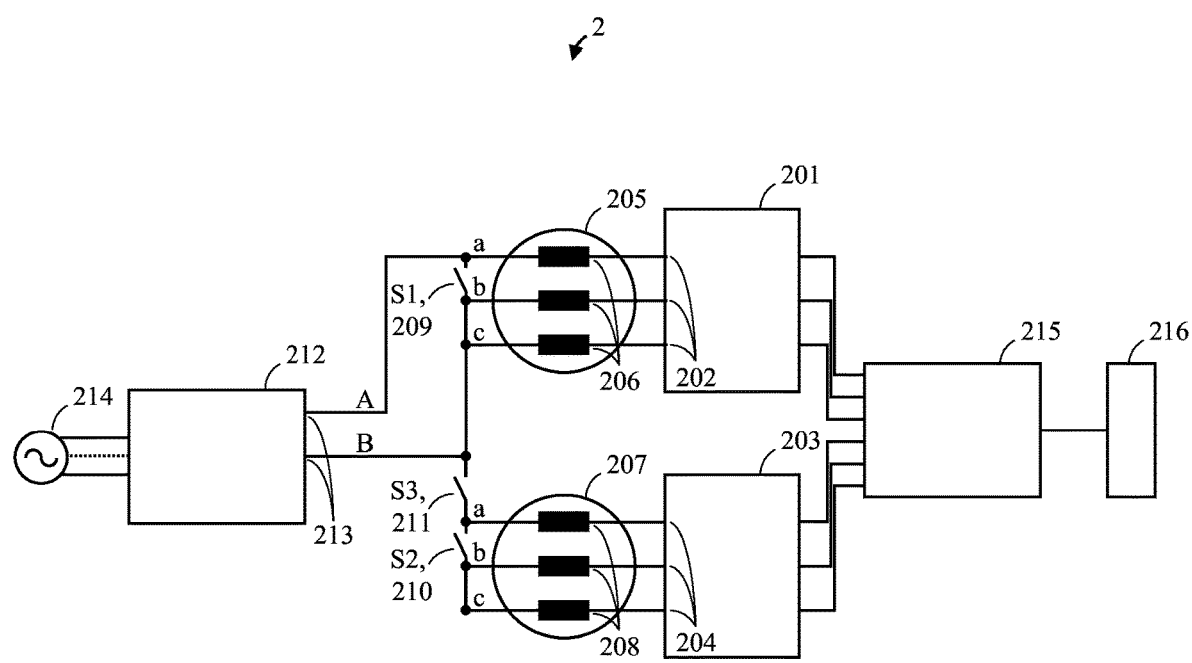

FIGS. 4 to 6 illustrate arrangements 2 according to various examples of the disclosure for single-phase charging.

For single-phase charging, the established distinct electric potentials are to be connected to two of the three legs 213, 'A', 'B', 'C' of the single-phase power grid interface 212 connectable to the arrangement 2.

Choosing two of three legs can yield three permutations, each of which is represented in a separate figure.

FIG. 4 shows an arrangement 2 in which the established distinct electric potentials are connected to the two legs 'A' and 'C' of the legs 213, 'A', 'B', 'C' of the power grid interface 212.

With reference to Table I established above, a connectivity between the legs 213, 'A', 'C' of the power grid interface 212 and the second ends 'a', 'b', 'c' of the stator windings 206, 208 of the respective electric motor 205, 207 may be expressed in dependence of combinations of the switching states of the first power switch 209, 'S1', the second power switch 210, 'S2', and the third power switch 211, 'S3' as follows:

TABLE III

Possible combinations of switching states $S_1$, $S_2$, $S_3$ enabling single-phase charging via grid interface legs A, C

| Switching states | | | first electric motor 205 | | | second electric motor 207 | | |
|---|---|---|---|---|---|---|---|---|
| S1 | S2 | S3 | a | b | c | a | b | c |
| 1 | 1 | 0 | A | A | A | C | C | C |
| 1 | 0 | 0/1 | A | A | A | —/A | C | C |
| 0 | 1 | 0/1 | A | —/C | —/C | C | C | C |
| 0 | 0 | 0/1 | A | — | — | | C | C |

For example, given the combination of S1=1, S2=0 and S3=0 (or 1), all the second ends 'a', 'b', 'c' of the stator windings 206 of the first electric motor 205 are connected to grid interface leg 'A', and the second ends 'b', 'c' of the stator windings 208 of the second electric motor 207 are connected to grid interface leg 'C'.

FIG. 5 shows an arrangement 2 in which the established distinct electric potentials are connected to the two legs 'B' and 'C' of the legs 213, 'A', 'B', 'C' of the power grid interface 212.

With reference to Table I established above, a connectivity between the legs 213, 'B', 'C' of the power grid interface 212 and the second ends 'a', 'b', 'c' of the stator windings 206, 208 of the respective electric motor 205, 207 may be expressed in dependence of combinations of the switching states of the first power switch 209, 'S1', the second power switch 210, 'S2', and the third power switch 211, 'S3' as follows:

TABLE IV

Possible combinations of switching states $S_1$, $S_2$, $S_3$ enabling single-phase charging via grid interface legs B, C

| Switching states | | | first electric motor 205 | | | second electric motor 207 | | |
|---|---|---|---|---|---|---|---|---|
| S1 | S2 | S3 | a | b | c | a | b | c |
| 1 | 1 | 0 | B | B | B | C | C | C |
| 1 | 0 | 0/1 | B | B | B | —/B | C | C |
| 0 | 1 | 0 | | B | B | C | C | C |
| 0 | 0 | 0/1 | | B | B | —/B | C | C |

For example, given the combination of S1=1, S2=0 and S3=0 (or 1), all the second ends 'a', 'b', 'c' of the stator windings 206 of the first electric motor 205 are connected to grid interface leg 'B', and the second ends 'b', 'c' of the stator windings 208 of the second electric motor 207 are connected to grid interface leg 'C'.

FIG. 6 shows an arrangement 2 in which the established distinct electric potentials are connected to the two legs 'A' and 'B' of the legs 213, 'A', 'B', 'C' of the power grid interface 212.

With reference to Table I established above, a connectivity between the legs 213, 'A', 'B' of the power grid interface 212 and the second ends 'a', 'b', 'c' of the stator windings 206, 208 of the respective electric motor 205, 207 may be expressed in dependence of combinations of the switching states of the first power switch 209, 'S1', the second power switch 210, 'S2', and the third power switch 211, 'S3' as follows:

TABLE V

Possible combinations of switching states $S_1$, $S_2$, $S_3$ enabling single-phase charging via grid interface legs A, B

| Switching states | | | first electric motor 205 | | | second electric motor 207 | | |
|---|---|---|---|---|---|---|---|---|
| S1 | S2 | S3 | a | b | c | a | b | c |
| 0 | 1 | 0/1 | A | B | B | —/B | —/B | —/B |
| 0 | 0 | 0/1 | A | B | B | —/B | | |

For example, given the combination of S1=0, S2=1 and S3=0 (or 1), the second ends 'b', 'c' of the stator windings 206 of the first electric motor 205 are connected to grid interface leg 'B', and all the second ends 'a', 'b', 'c' of the stator windings 208 of the second electric motor 207 are either connected to no grid interface leg at all, or to grid interface leg 'B' (depending on the switching state of the third power switch 211, 'S3').

Generally, each of the combinations of switching states listed in Tables III, IV and V above ensures that at least two of the three stator windings 206, 208 of the respective electric motor 205, 207—corresponding to the established distinct electric potentials mentioned previously—are connected to a same grid interface leg 213. In said tables, the second ends of a respective electric motor 205, 207 having a same electric potential are shaded.

Having more than one second end of a respective electric motor 205, 207 on a same electric potential prevents the electric motors 205, 207 from producing torque/drive, and at the same time a continuous power transmission path is provided for charging of the energy storage 216 from the power grid 214.

Figure 7:
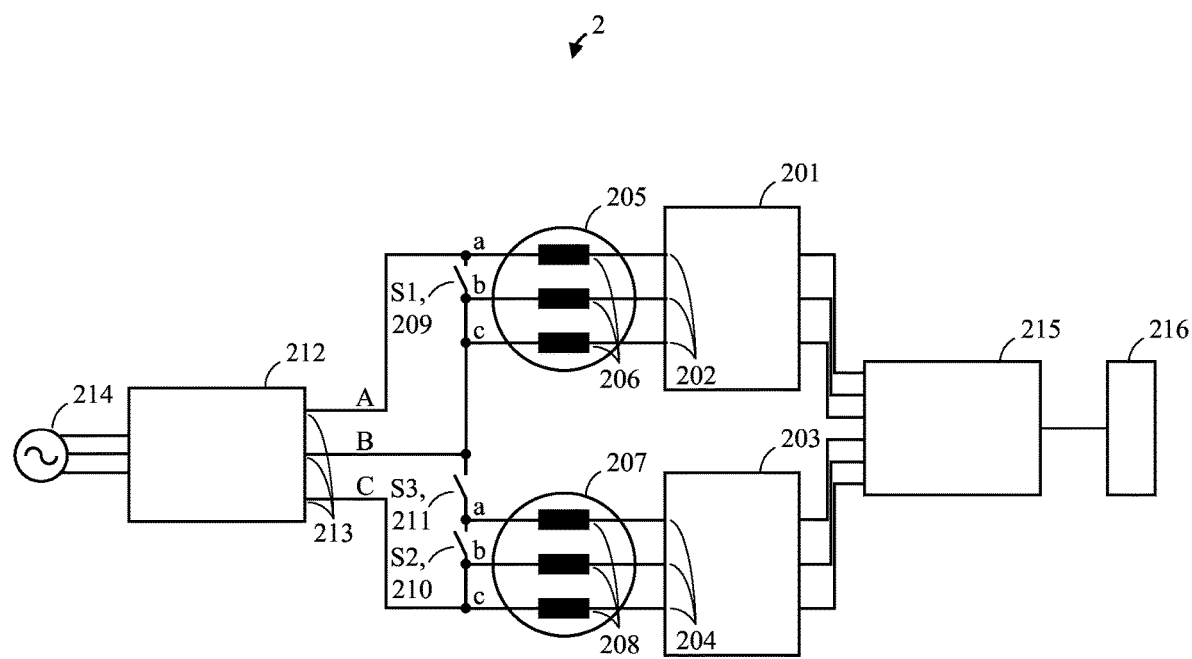
FIG. 7 illustrates an arrangement according to an example of the disclosure for three-phase charging.

FIG. 7 illustrates an arrangement 2 according to an example of the disclosure for three-phase charging.

For three-phase charging, the established distinct electric potentials are to be connected to the three respective legs 213, 'A', 'B', 'C' of the three-phase power grid interface 212 connectable to the arrangement 2 as follows:

The first power switch 209, 'S1' may be configured to disconnect one (i.e., second end 'a') of the second ends 'a', 'b', 'c' of the stator windings 206 of the first electric motor 205 from all other (i.e., second ends 'b', 'c') of its second ends 'a', 'b', 'c' to establish at most two distinct electric potentials.

The second power switch 210, 'S2' may be configured to disconnect one a of the second ends 'a', 'b', 'c' of the stator windings 208 of the second electric motor 207 from all other b, c of its second ends 'a', 'b', 'c' to establish at most two further distinct electric potentials.

The third power switch 211, 'S3' may be configured to combine those two of the established distinct electric potentials involving most (i.e., second ends 'b', 'c') of the stator windings 206 of the first electric motor 205 and least (i.e., second end 'a') of the stator windings 208 of the second electric motor 207.

In other words, the first power switch 209, 'S1' may be open/non-conductive/off (i.e., S1=0), the second power switch 210, 'S2' may be open/non-conductive/off (i.e., S2=0) as well, and the third power switch 211, 'S3' may be closed/conductive/on (i.e., S3=1), as is indicated in FIG. 7.

With reference to Table I established above, a connectivity between the legs 213, 'A', 'B', 'C' of the power grid interface 212 and the second ends 'a', 'b', 'c' of the stator windings 206, 208 of the respective electric motor 205, 207 may thus be expressed in dependence of a single combination of switching states of the first power switch 209, 'S1', the second power switch 210, 'S2', and the third power switch 211, 'S3' as:

TABLE VI

Possible combination of switching states $S_1$, $S_2$, $S_3$ enabling three-phase charging via grid interface legs A, B, C

| Switching states | | | first electric motor 205 | | | second electric motor 207 | | |
|---|---|---|---|---|---|---|---|---|
| S1 | S2 | S3 | a | b | c | a | b | c |
| 0 | 0 | 1 | A | B | B | B | C | C |

The combination of switching states noted in Table VI above ensures that at least two of the three stator windings 206, 208 of the respective electric motor 205, 207—corresponding to the established distinct electric potentials mentioned previously—are connected to a same grid interface leg 213. In said table, the second ends of a respective electric motor 205, 207 having a same electric potential are shaded.

Having more than one second end of a respective electric motor 205, 207 on a same electric potential prevents the electric motors 205, 207 from producing torque/drive, and at the same time continuous power transmission paths are provided for charging of the energy storage 216 from the power grid 214.

Figure 8:
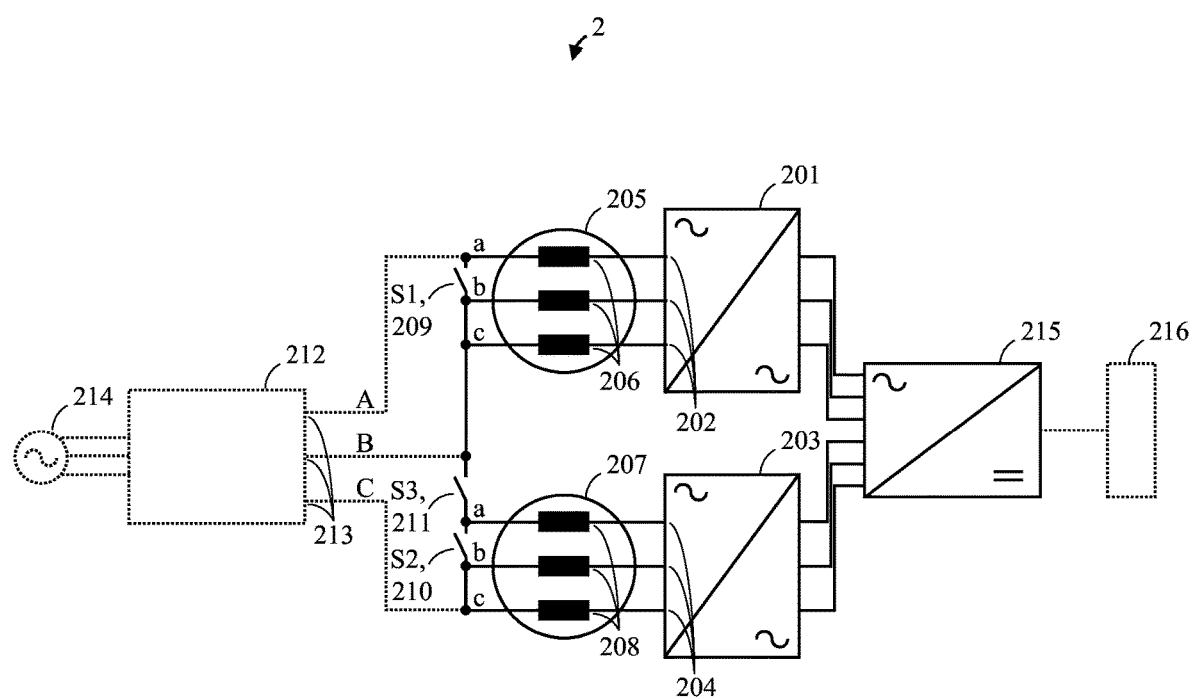
FIG. 8 illustrates an arrangement according to an example of the disclosure including an AC/AC power converter.

FIG. 8 illustrates an arrangement 2 according to an example of the disclosure including an AC/AC power converter.

At least one of the first and second power converters 201, 203 may be configured to perform AC/AC power conversion. To this end, the first ends of the stator windings 206, 208 of the respective motor 205, 207 may be connected to the respective legs 202, 204 of an AC side of the at least one of the first and second power converters 201, 203.

As shown in FIG. 8, an energy storage interface 215 may be connected to the first and second AC/AC power converters 201, 203, and an energy storage 216 may be connected to the energy storage interface 216. Since the energy storage 216 is a DC device, such as a high-voltage powertrain battery, the energy storage interface 215 is configured to mediate between the energy storage 216 and the first and second AC/AC power converters 201, 203. In other words, the energy storage interface 215 may be an AC/DC device, as is indicated in FIG. 8.

Figure 9:
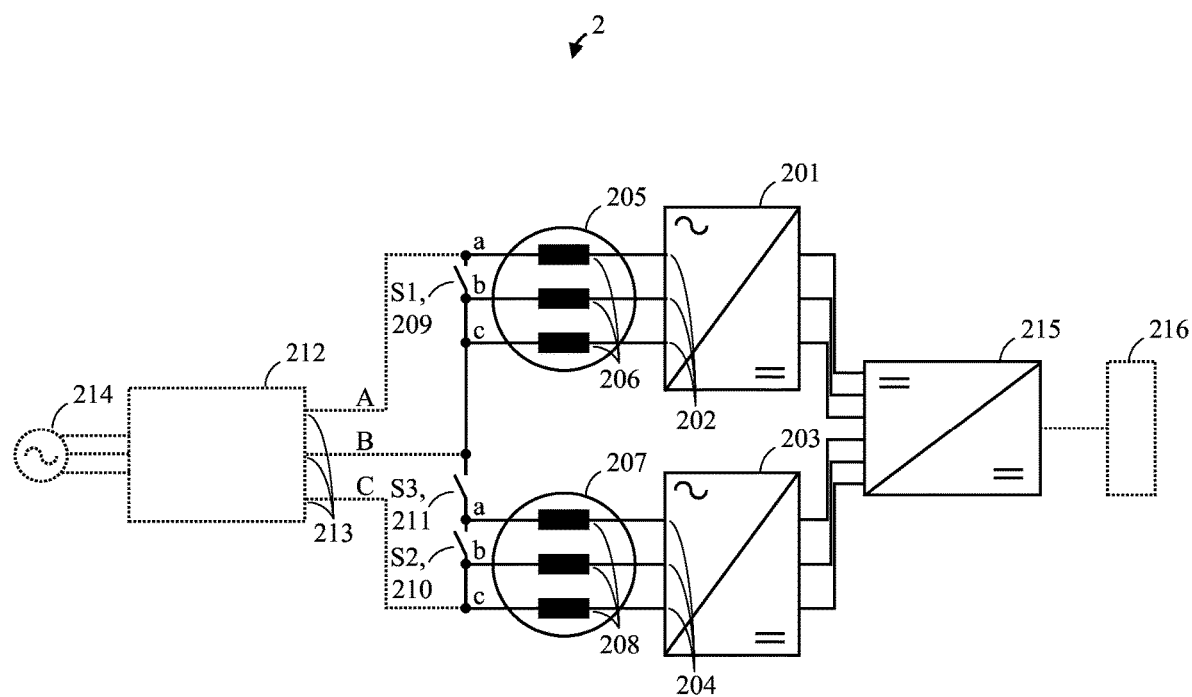
FIG. 9 illustrates an arrangement 2 according to an example of the disclosure including an AC/DC power converter.

FIG. 9 illustrates an arrangement 2 according to an example of the disclosure including an AC/DC power converter.

The arrangement 2 of FIG. 9 corresponds to the embodiment of FIG. 8, with the exception that in the arrangement 2 of FIG. 9, at least one of the first and second power converters 201, 203 may be configured to perform AC/DC power conversion. To this end, the first ends of the stator windings 206, 208 of the respective motor may be connected to the respective legs 202, 204 of the AC side of the at least one of the first and second power converters 201, 203.

In the embodiment of FIG. 9, the energy storage interface 215 is configured to mediate between the energy storage 216, which is a DC device, and the DC side of the first and second AC/DC power converters 201, 203. In other words, the energy storage interface 215 is a DC/DC device, as is indicated in FIG. 9.

The energy storage interface 215 may be omitted if the energy storage 216 and the first and second AC/DC power converters 201, 203 match in terms of DC voltage.

The configurations of FIGS. 8 and 9 improve a customizability to various EV requirements.

Figure 10:
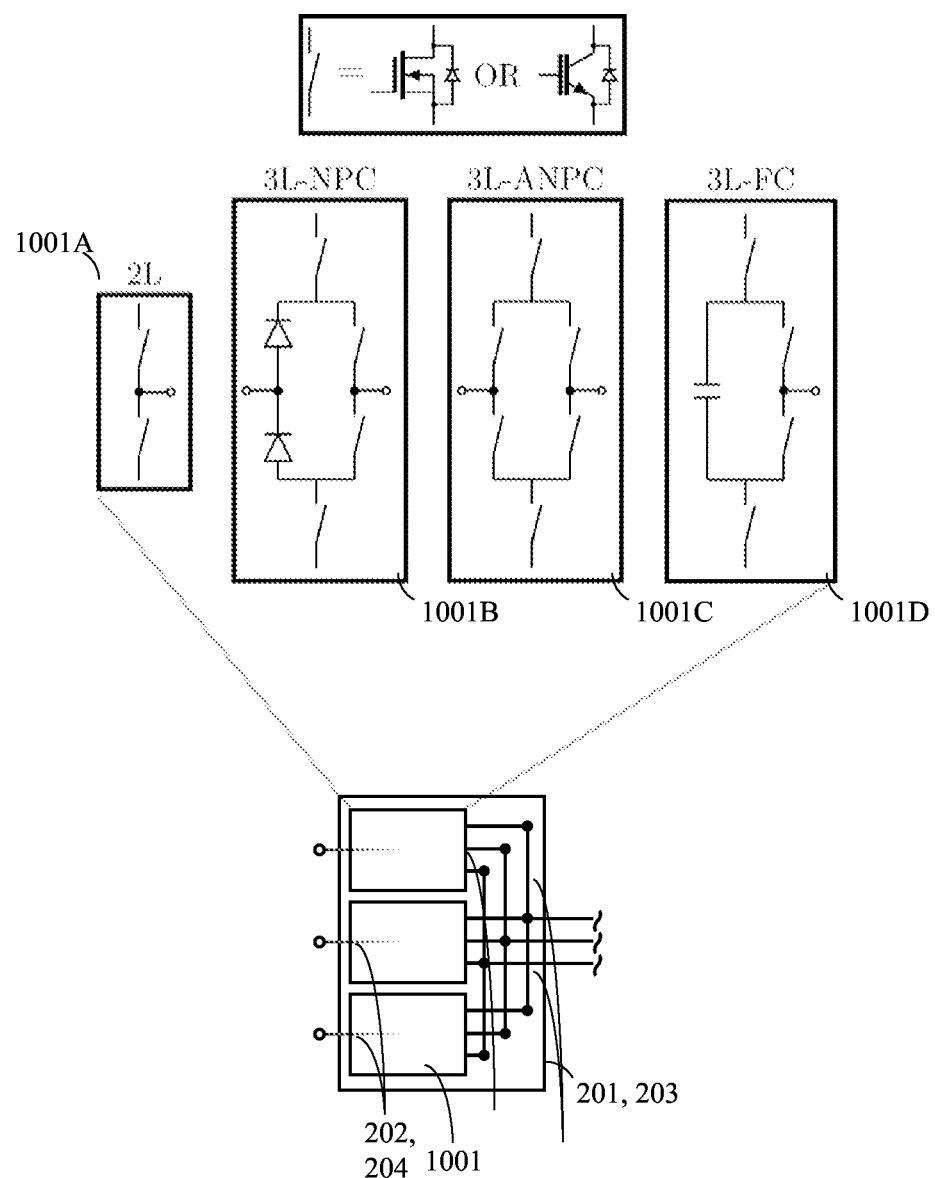
FIG. 10 illustrates a general scheme of a power converter of an arrangement according to an example of the disclosure.

FIG. 10 illustrates a general scheme of a power converter 201, 203 of an arrangement 2 according to an example of the disclosure.

At least one of the first and second power converters 201, 203 schematically suggested in a lower part of FIG. 10 may comprise a parallel connection—on the same rails—of at least three independently controlled half-bridges 1001. These half-bridges 1001 expose/provide the respective legs 202, 204 of the at least one of the first and second power converters 201, 203.

For example, the at least one of the first and second power converters 201, 203 may comprise a parallel connection of three independently controlled two-level (2L) half-bridges 1001A, as is indicated on a left side of a middle part of FIG. 10. Such a 2L half-bridge 1001A may comprise a series connection of power switches having a center tap.

This configuration based on 2L half-bridges is configured to alternate between two levels of DC voltages such as +VDC/2 and −VDC/2, which implies a low circuit complexity. 2L half-bridges are particularly suitable for moderate-voltage applications.

Alternatively, at least one of the first and second power converters 201, 203 may comprise a parallel connection of three independently controlled n-level (nL) half-bridges 1001B-1001D, wherein a number n of DC voltage levels exceeds two. Various kinds of three-level (3L) half-bridges 1001B-1001D are indicated on a right side of a middle part of FIG. 10.

The configuration based on 3L half-bridges is configured to alternate between three levels of DC voltages such as +VDC/2, 0, and −VDC/2. The additional zero-voltage level reduces a loss and stress of switching components. As such, 3L half-bridges are particularly suitable for high-voltage applications.

As a first example, a 3L-NPC (Neutral Point Clamped) half-bridge 1001B may comprise a 2L half-bridge as mentioned above, connected in parallel to a series connection of diodes for clamping the neutral point, wherein this parallel connection is enclosed serially by additional power switches.

As a second example, a 3L-ANPC (Active Neutral Point Clamped) half-bridge 1001C may comprise two 2L half-bridges as mentioned above connected in parallel, wherein this parallel connection is enclosed serially by additional power switches.

This configuration based on 3L-ANPC half-bridges 1001C may "enforce" switching losses to occur on specific power switches of the half-bridge, which improves an overall efficiency.

As a third example, a 3L-FC (Flying Capacitor) half-bridge 1001D may comprise a 2L half-bridge as mentioned above connected in parallel to a flying capacitor, wherein this parallel connection is enclosed serially by additional power switches.

In particular, the number n of levels may be extended from 3 to N for all the three-level configurations.

Each of the above-mentioned independently controlled half-bridges 1001 may in turn be composed of parallel connected, dependently controlled half-bridges (with the goal of splitting an output current of the half-bridge 1001).

In an upper part of FIG. 10, it is indicated that the power switches forming the afore-mentioned half-bridges 1001 may comprise bipolar transistors (e.g., IGBTs) or field effect transistors (FETs).

Figure 11:
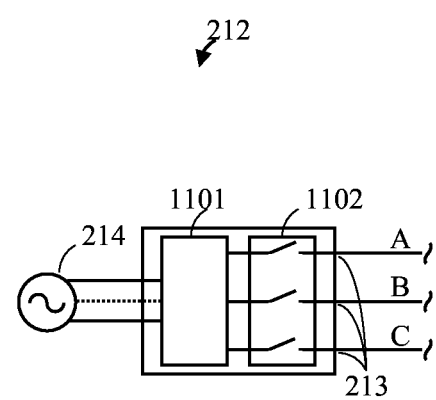
FIG. 11 illustrates a general scheme of a power grid interface connectable to an arrangement according to an example of the disclosure.

FIG. 11 illustrates a general scheme of a power grid interface 212 connectable to an arrangement 2 according to an example of the disclosure.

The arrangement 2 of FIG. 11 is connectable to the power grid interface 212, which preferably comprises an electromagnetic interference (EMI) filter 1101 and an all-pole grid cutoff switch 1102 exposing/providing the legs 213 of the power grid interface 212.

This configuration improves EMI suppression and a safety of operation in charging modes of the EV.

Figure 12:
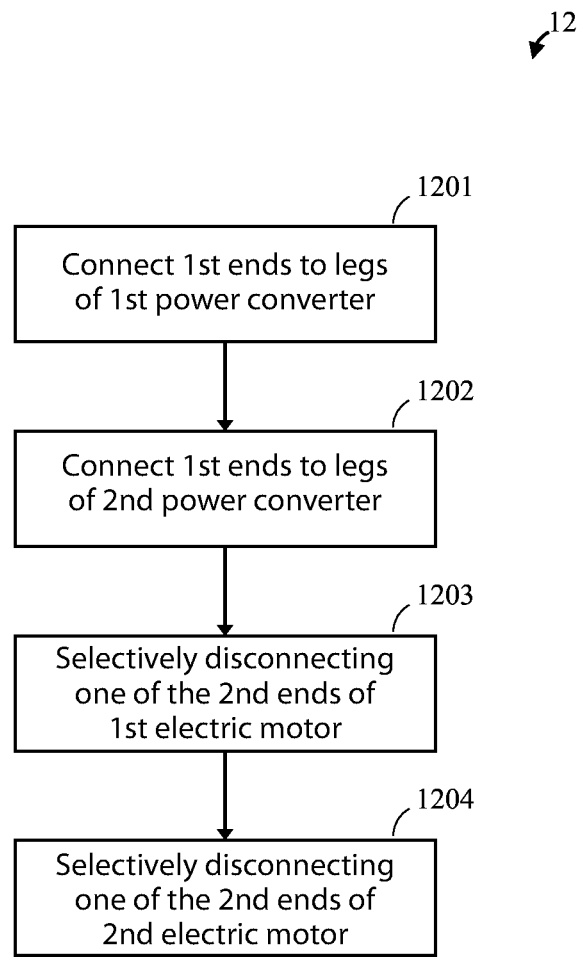
FIG. 12 illustrates a flow chart of a method according to an example of the disclosure of operating an arrangement.

FIG. 12 illustrates a flow chart of a method 12 according to an example of the disclosure of operating an arrangement 2.

The method 12 is for operating an arrangement 2 for electric power conversion and dual electric drive, which comprises first and second power converters 201, 203; first and second electric motors 205, 207; and first and second power switches 209, 210, 'S1', 'S2'.

The first and second power converters 201, 203 respectively comprise three legs 202, 204. The first and second electric motors 205, 207 respectively include three open-end stator windings 206, 208 respectively having first and second ends (indicated as 'a', 'b', 'c').

The second ends 'a', 'b', 'c' of the stator windings 206 of the first electric motor 205 are connected together and have a same electric potential. Likewise, the second ends 'a', 'b', 'c' of the stator windings 208 of the second electric motor 207 are connected together and have a same electric potential.

The method 12 comprises connecting 1201, connecting 1202, selectively disconnecting 1203, and selectively disconnecting 1204 steps:

A first step involves connecting 1201 the first ends of the stator windings 206 of the first electric motor 205 to respective legs of the three legs 202 of the first power converter 201.

A second step involves connecting 1202 the first ends of the stator windings 208 of the second electric motor 207 to respective legs of the three legs 204 of the second power converter 203.

A third step involves selectively disconnecting 1203, using the first power switch 209, 'S1', at most one of the second ends 'a', 'b', 'c' of the stator windings 206 of the first electric motor 205 from all other of the second ends 'a', 'b', 'c' to establish at most two distinct electric potentials.

A fourth step involves selectively disconnecting 1204, using the second power switch 210, 'S2', at most one of the second ends 'a', 'b', 'c' of the stator windings 208 of the second electric motor 207 from all other of the second ends 'a', 'b', 'c' to establish at most two further distinct electric potentials.

This enables a charging mode of the EV in connection with a three-phase power grid without producing any torque, making use of all the power electronics already existing for the traction system and the motor inductances. As such, space is saved and power density, efficiency and reliability are increased.

Preferably, the method 12 comprises utilizing the arrangement 2 according to the first aspect or any of its embodiments.

As a consequence, the above-mentioned features and associated advantages of the arrangement 2 also apply in connection with the method 12 according to the third aspect by analogy.

The processor or processing circuitry of the of the arrangement 2 may comprise hardware and/or the processing circuitry may be controlled by software. The hardware may comprise analog circuitry or digital circuitry, or both analog and digital circuitry. The digital circuitry may comprise components such as application-specific integrated circuits (ASICs), field-programmable gate arrays (FPGAs), adaptive compute acceleration platforms (ACAPs) digital signal processors (DSPs), or multi-purpose processors.

The arrangement 2 may further comprise memory circuitry, which stores one or more instruction(s) that can be executed by the processor or by the processing circuitry, in particular under control of the software. For instance, the memory circuitry may comprise a computer program (not shown) comprising program code for carrying out the method 12 according to the third aspect of the disclosure or any of its embodiments when implemented on a processor of the arrangement 2 according to the first aspect or any of its embodiments.

The present disclosure has been described in connection with various embodiments as examples as well as implementations. However, other variations can be understood and effected by those persons skilled in the art and practicing the claimed features, from the studies of the drawings, this disclosure and the claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. An arrangement configured for electric power conversion and dual electric drive, the arrangement comprising:
first and second power converters respectively including at least three legs;
first and second electric motors respectively including at least three open-end stator windings, wherein each of the at least three open-end stator windings respectively having first and second ends; and
first and second power switches, wherein
the first ends of the open-end stator windings of the first electric motor are respectively connected to the three legs of the first power converter,
the first ends of the open-end stator windings of the second electric motor are respectively connected to the three legs of the second power converter,
the second ends of the open-end stator windings of the first electric motor are connected together, wherein the second ends of the open-end stator windings of the first electric motor have a same electric potential,
the second ends of the stator windings of the second electric motor are connected together, wherein the second ends of the stator windings of the second electric motor have a same electric potential,
the first power switch is configured to selectively disconnect one end, of the second ends of the stator windings of the first electric motor, from all other ends of the second ends of the stator windings of the first electric motor and establish at most two distinct electric potentials, and
the second power switch is configured to selectively disconnect one end of the second ends of the stator windings of the second electric motor from all other ends of the second ends of the stator windings of the second electric motor and establish at most two distinct electric potentials.

2. The arrangement of claim 1, further comprising
a third power switch configured to selectively combine two of the established distinct electric potentials involving the open-end stator windings of the first electric motor and the open-end stator windings of the second electric motor.

3. The arrangement of claim 1, wherein
the first power switch is configured to disconnect none of the second ends of the open-end stator windings of the first electric motor from each other and establish a single distinct electric potential,
the second power switch is configured to disconnect none of the second ends of the open-end stator windings of the second electric motor from each other and establish the single distinct electric potential, and
at least one of the first and second power converters are configured to operate according to a direct torque control direct torque control (DTC), field oriented control (FOC), model predictive control (MPC), or open-loop control strategy, and the at least one of the first and second power converters are configured to regulate a torque of the respective electric motor according to a respective torque reference.

4. The arrangement of claim 2, wherein
the first power switch is configured to disconnect none of the second ends of the open-end stator windings of the first electric motor from each other and establish the single distinct electric potential;
the second power switch is configured to disconnect none of the second ends of the open-end stator windings of the second electric motor from each other and establish the single distinct electric potential; and
the third power switch is configured to combine none of the established distinct electric potentials.

5. The arrangement of claim 1, wherein
the established distinct electric potentials are connectable to two respective legs of a single-phase power grid interface connectable to the arrangement.

6. The arrangement of claim 2, wherein
the first power switch is configured to disconnect one end of the second ends of the open-end stator windings of the first electric motor from all other ends of the second ends of the open-end stator windings of the first electric motor and establish at most two distinct electric potentials,
the second power switch is configured to disconnect one end of the second ends of the open-end stator windings of the second electric motor from all other ends of the second ends of the open-end stator windings of the second electric motor and establish at most two distinct electric potentials,
the third power switch is configured to combine two of the established distinct electric potentials involving the open-end stator windings of the first electric motor and the open-end stator windings of the second electric motor, and
the established distinct electric potentials are connectable to three respective legs of a three-phase power grid interface connectable to the arrangement.

7. The arrangement of claim 1, wherein
at least one of the first and second power converters are configured to regulate an electric parameter on a demand side of the at least one of the first and second power converters.

8. The arrangement of claim 1, wherein
at least one of the first and second power converters are configured to perform AC/AC power conversion, and
the first ends of the stator windings of the respective motor are connected to the respective legs of an AC side of the at least one of the first and second power converters.

9. The arrangement of claim 1, wherein
at least one of the first and second power converters are configured to perform AC/DC power conversion, and
the first ends of the open-end stator windings of the respective motor are connected to the respective legs of the AC side of the at least one of the first and second power converters.

10. The arrangement of claim 1, wherein
at least one of the first and second power converters include a parallel connection of three independently controlled half-bridges providing the respective legs of the at least one of the first and second power converters.

11. The arrangement of claim 10, wherein
at least one of the first and second power converters include a parallel connection of three independently controlled two-level (2L) half-bridges.

12. The arrangement of claim 10, wherein
at least one of the first and second power converters include a parallel connection of three independently controlled n-level (nL) half-bridges, wherein a number n of levels exceeds two.

13. The arrangement of claim 1, wherein
the arrangement is connectable to a power grid interface having an electromagnetic interference (EMI) filter and an all-pole grid cutoff switch providing the legs of the power grid interface.

14. The arrangement of claim 1, wherein
at least one of the first and second electric motors include an induction motor or a permanent magnet synchronous machine.

15. The arrangement of claim 2, wherein
the established distinct electric potentials are connectable to two respective legs of a single-phase power grid interface connectable to the arrangement.

16. The arrangement of claim 4, wherein
at least one of the first and second power converters are configured to operate according to a direct torque control (DTC), field oriented control (FOC), model predictive control (MPC), or open-loop control strategy, and the at least one of the first and second power converters are configured to regulate a torque of the respective electric motor according to a respective torque reference.

17. A system, comprising:
an arrangement, wherein the arrangement comprises:
   first and second power converters respectively comprising at least three legs;
   first and second electric motors respectively including at least three open-end stator windings, wherein each of the at least three open-end stator windings respectively having first and second ends;
   first and second power switches, wherein
      the first ends of the open-end stator windings of the first electric motor are respectively connected to the at least three legs of the first power converter,
      the first ends of the open-end stator windings of the second electric motor are respectively connected to the at least three legs of the second power converter,
      the second ends of the open-end stator windings of the first electric motor are connected together, wherein the second ends of the open-end stator windings of the first electric motor have a same electric potential,
      the second ends of the stator windings of the second electric motor are connected together, wherein the second ends of the stator windings of the second electric motor have a same electric potential,
      the first power switch is configured to selectively disconnect one end of the second ends of the stator windings of the first electric motor from all other ends of the second ends of the stator windings of the first electric motor and establish at most two distinct electric potentials, and
      the second power switch is configured to selectively disconnect one end of the second ends of the stator windings of the second electric motor from all other end of the second ends of the stator windings of the second electric motor and establish at most two further distinct electric potentials, wherein the system further comprises:
   a power grid interface connected to the first and second electric motors of the arrangement;
   an energy storage interface connected to the first and second power converters of the arrangement; and
   an energy storage connected to the energy storage interface.

18. A method of operating an arrangement for electric power conversion and dual electric drive, wherein the arrangement includes:
   first and second power converters respectively having at least three legs,
   first and second electric motors respectively including at least three open-end stator windings, wherein each of the at least three open-end stator windings respectively having first and second ends,
   first and second power switches, wherein
   the second ends of the open-end stator windings of the first electric motor are connected together and the second ends of the open-end stator windings of the first electric motor have a same electric potential, and
   the second ends of the open-end stator windings of the second electric motor are connected together, and the second ends of the open-end stator windings of the second electric motor have a same electric potential,
the method comprising:
   respectively connecting the first ends of the open-end stator windings of the first electric motor to the three legs of the first power converter;
   respectively connecting the first ends of the open-end stator windings of the second electric motor to the three legs of the second power converter;
   selectively disconnecting, using the first power switch, one end of the second ends of the open-end stator windings of the first electric motor from all other ends of the second ends of the open-end stator windings of the first electric motor and establishing two distinct electric potentials; and
   selectively disconnecting, using the second power switch, one end of the second ends of the open-end stator windings of the second electric motor from all other ends of the second ends of the open-end stator windings of the second electric motor and establishing two distinct electric potentials.

19. The system of claim 17, wherein
at least one of the first and second power converters are configured to perform AC/AC power conversion, and
the first ends of the stator windings of the respective motor are connected to the respective legs of an AC side of the at least one of the first and second power converters.

20. The method of claim 18, wherein
at least one of the first and second power converters are configured to perform AC/AC power conversion, and
the first ends of the stator windings of the respective motor are connected to the respective legs of an AC side of the at least one of the first and second power converters.

* * * * *